US010013659B2

(12) United States Patent
Li et al.

(10) Patent No.: US 10,013,659 B2
(45) Date of Patent: Jul. 3, 2018

(54) METHODS AND SYSTEMS FOR CREATING A CLASSIFIER CAPABLE OF PREDICTING PERSONALITY TYPE OF USERS

(71) Applicant: XEROX CORPORATION, Norwalk, CT (US)

(72) Inventors: Juan Li, Webster, NY (US); Sumit Bhatia, San Jose, CA (US); Chandrima Sarkar, Minneapolis, MN (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 383 days.

(21) Appl. No.: 14/731,445

(22) Filed: Jun. 5, 2015

(65) Prior Publication Data

US 2016/0132788 A1  May 12, 2016

Related U.S. Application Data

(60) Provisional application No. 62/076,553, filed on Nov. 7, 2014.

(51) Int. Cl.
*G06N 99/00* (2010.01)
*G06Q 50/00* (2012.01)

(52) U.S. Cl.
CPC .......... *G06N 99/005* (2013.01); *G06Q 50/01* (2013.01)

(58) Field of Classification Search
CPC ......... G06N 99/005; G06N 5/04; G06Q 10/00
USPC .......................................................... 706/12
See application file for complete search history.

(56) References Cited

U.S. PATENT DOCUMENTS

| 8,150,692 B2 | 4/2012 | Stewart et al. |
| 9,269,374 B1 * | 2/2016 | Conway ............. G06K 9/00302 |
| 2012/0284080 A1 * | 11/2012 | De Oliveira ........... G06Q 10/04 705/7.29 |
| 2013/0018968 A1 * | 1/2013 | Pennacchiotti ........ G06Q 10/10 709/206 |

(Continued)

OTHER PUBLICATIONS

Biel, J.; Gatica-Perez, D., "The YouTube Lens: Crowdsourced Personality Impressions and Audiovisual Analysis of Vlogs,"Multimedia, IEEE Transactions on, vol. 15, No. 1, pp. 41,55, Jan. 2013.

(Continued)

Primary Examiner — Dave Misir
(74) Attorney, Agent, or Firm — Jones Robb, PLLC

(57) ABSTRACT

The disclosed embodiments illustrate methods and systems for creating a classifier for predicting a personality type of users. The method includes receiving a first tag for messages, from a crowdsourcing platform. The first tag relates to personality type of users. Further, the messages, tagged with first tag are segregated into a training data and a testing data. Further, parameters associated with set of messages in the training data are determined based on type of messages. Further, classifiers are trained for a personality type. Further, a second tag for set of messages in testing data is predicted using trained classifiers for a combination of parameters. A performance of classifiers is determined by comparing the second tag and the first tag associated with set of messages in the testing data. A classifier is selected from classifiers, which is indicative of a best combination of parameters to predict personality type of users.

21 Claims, 3 Drawing Sheets

(56) References Cited

U.S. PATENT DOCUMENTS

| | | | | |
|---|---|---|---|---|
| 2014/0074920 A1* | 3/2014 | Nowak | ............... | G06Q 50/01 709/204 |
| 2014/0095150 A1* | 4/2014 | Berjikly | ............. | G06F 17/2785 704/9 |
| 2014/0122383 A1* | 5/2014 | Shen | ..................... | A63F 13/12 706/12 |
| 2014/0317030 A1* | 10/2014 | Shen | ..................... | G06N 3/006 706/12 |
| 2014/0365208 A1* | 12/2014 | De Choudhury | ...... | G06Q 10/10 704/9 |

OTHER PUBLICATIONS

Alm, C. O., Roth, D., & Sproat, R. (Oct. 2005). Emotions from text: machine learning for text-based emotion prediction. In Proceedings of the conference on Human Language Technology and Empirical Methods in Natural Language Processing (pp. 579-586). Association for Computational Linguistics.

U.S. Appl. No. 14/624,925, filed Feb. 18, 2015, "Methods and Systems for Predicting Psychological Types," Albert et al.

\* cited by examiner

METHODS AND SYSTEMS FOR CREATING A CLASSIFIER CAPABLE OF PREDICTING PERSONALITY TYPE OF USERS

CROSS-REFERENCE TO RELATED APPLICATION

This application claims the benefit of U.S. Provisional Application No. 62/076,553, filed Nov. 7, 2014.

TECHNICAL FIELD

The presently disclosed embodiments are related, in general, to social networking platforms. More particularly, the presently disclosed embodiments are related to methods and systems for creating a classifier capable of predicting a personality type of users.

BACKGROUND

Determining personality-types of users has always been of interest to various marketing firms/advertising firms/organizations to identify target users for their respective products/services. However, predicting personality types may not be a trivial task due to a limited access to information related to the users.

Emergence of social networking mediums has provided a platform to retrieve information related to one or more users of social networking platforms. Such social networking mediums have allowed users to share their respective thoughts, and emotions with other users of the social networking platforms. Usually, users convey their thoughts through either text messages, multimedia content, or a combination of both. As the social networking platforms may have a large number of users, the number of the text messages or the multimedia content shared by such users may also be huge. Processing and classifying such a huge number of the text messages or the multimedia content may be a humongous task for determining personality types of the users.

SUMMARY

According to the embodiments illustrated herein, there is provided a method for creating a classifier capable of predicting a personality type of one or more users. The method includes receiving, by a transceiver, a first tag associated with each of one or more messages, from a crowdsourcing platform. The first tag relates to said personality type of said one or more users. The one or more messages are shared by said one or more users on one or more social media platforms. Each of said one or more messages include one or more types of messages. Further, the one or more types of messages comprise at least one of an audio message, a video message, or a text message. The method includes segregating said one or more messages, tagged with said first tag, into a first data set and a second data set. In an embodiment, the first data set corresponds to a training data. On the other hand, the second data set corresponds to a testing data. Each of said training data and said testing data comprises a set of messages from said one or more messages. The method further includes determining one or more parameters associated with said set of messages in said training data based on said one or more types of messages. The method further includes determining one or more combinations of said one or more parameters. Further, the method includes training one or more classifiers for said personality type. Each of said one or more classifiers is trained for a combination from said one or more combinations of said one or more parameters. The method further includes predicting a second tag for said set of messages in said testing data using said trained one or more classifiers. The method further includes determining a performance of each of said one or more classifiers, based on a comparison of said second tag with said first tag associated with said set of messages in said testing data. Thereafter, the method includes selecting said classifier from said one or more classifiers. The selected classifier is indicative of a best combination from said one or more combinations of said one or more parameters to predict said personality type of said one or more users. The method is performed by one or more microprocessors.

According to the embodiments illustrated herein, there is provided a system for creating a classifier capable of predicting a personality type of one or more users. The system includes a transceiver configured to receive a first tag associated with each of one or more messages, from a crowdsourcing platform. The first tag relates to said personality type of said one or more users. The one or more messages are shared by said one or more users on one or more social media platforms. Each of said one or more messages include one or more types of messages. The one or more types of messages comprise at least one of an audio message, a video message, or a text message. The system includes one or more microprocessors configured to segregate said one or more messages, tagged with said first tag, into a first data set and a second data set. In an embodiment, the first data set corresponds to a training data. On the other hand, the second data set corresponds to a testing data. Each of said training data and said testing data comprises a set of messages from said one or more messages. The system includes one or more microprocessors configured to determine one or more parameters associated with said set of messages in said training data based on said one or more types of messages. The system further includes one or more microprocessors configured to determine one or more combinations of said one or more parameters. The system further includes one or more microprocessors configured to train one or more classifiers for said personality type. Each of said one or more classifiers is trained for a combination from said one or more combinations of said one or more parameters. The system further includes one or more microprocessors configured to predict a second tag for said set of messages in said testing data using said trained one or more classifiers. The system further includes one or more microprocessors configured to determine a performance of each of said one or more classifiers, based on a comparison of said second tag with said first tag associated with said set of messages in said testing data. Thereafter, the system includes one or more microprocessors configured to select said classifier from said one or more classifiers. The selected classifier is indicative of a best combination from said one or more combinations of said one or more parameters to predict said personality type of said one or more users.

According to the embodiments illustrated herein, there is provided a computer program product for use with a computing device. The computer program product comprises a non-transitory computer readable medium, the non-transitory computer readable medium stores a computer program code for creating a classifier capable of predicting a personality type of one or more users. The computer program code is executable by a transceiver to receive a first tag associated with each of one or more messages, from a crowdsourcing platform. The first tag relates to said personality type of said one or more users. The one or more messages are shared by said one or more users on one or more social media platforms. Each of said one or more messages include one or more types of messages. The one or more types of messages comprise at least one of an audio message, a video message, or a text message. The computer program code is executable by one or more microprocessors to segregate said one or more messages, tagged with said first tag, into a first data set and a second data set. In an embodiment, the first data set corresponds to a training data. On the other hand, the second data set corresponds to a testing data. Each of said training data and said testing data comprises a set of messages from said one or more messages. The computer program code is executable by one or more microprocessors to determine one or more parameters associated with said set of messages in said training data based on said one or more types of messages. The computer program code is further executable by one or more microprocessors to determine one or more combinations of said one or more parameters. The computer program code is further executable by one or more microprocessors to train one or more classifiers for said personality type. Each of said one or more classifiers is trained for a combination from said one or more combinations of said one or more parameters. The computer program code is further executable by one or more microprocessors to predict a second tag for said set of messages in said testing data using said trained one or more classifiers. The computer program code is further executable by one or more microprocessors to determine a performance of each of said one or more classifiers, based on a comparison of said second tag with said first tag associated with said set of messages in said testing data. Thereafter, the computer program code is further executable by one or more microprocessors to select said classifier from said one or more classifiers. The selected classifier is indicative of a best combination from said one or more combinations of said one or more parameters to predict said personality type of said one or more users.

BRIEF DESCRIPTION OF DRAWINGS

The accompanying drawings illustrate the various embodiments of systems, methods, and other aspects of the disclosure. Any person with ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
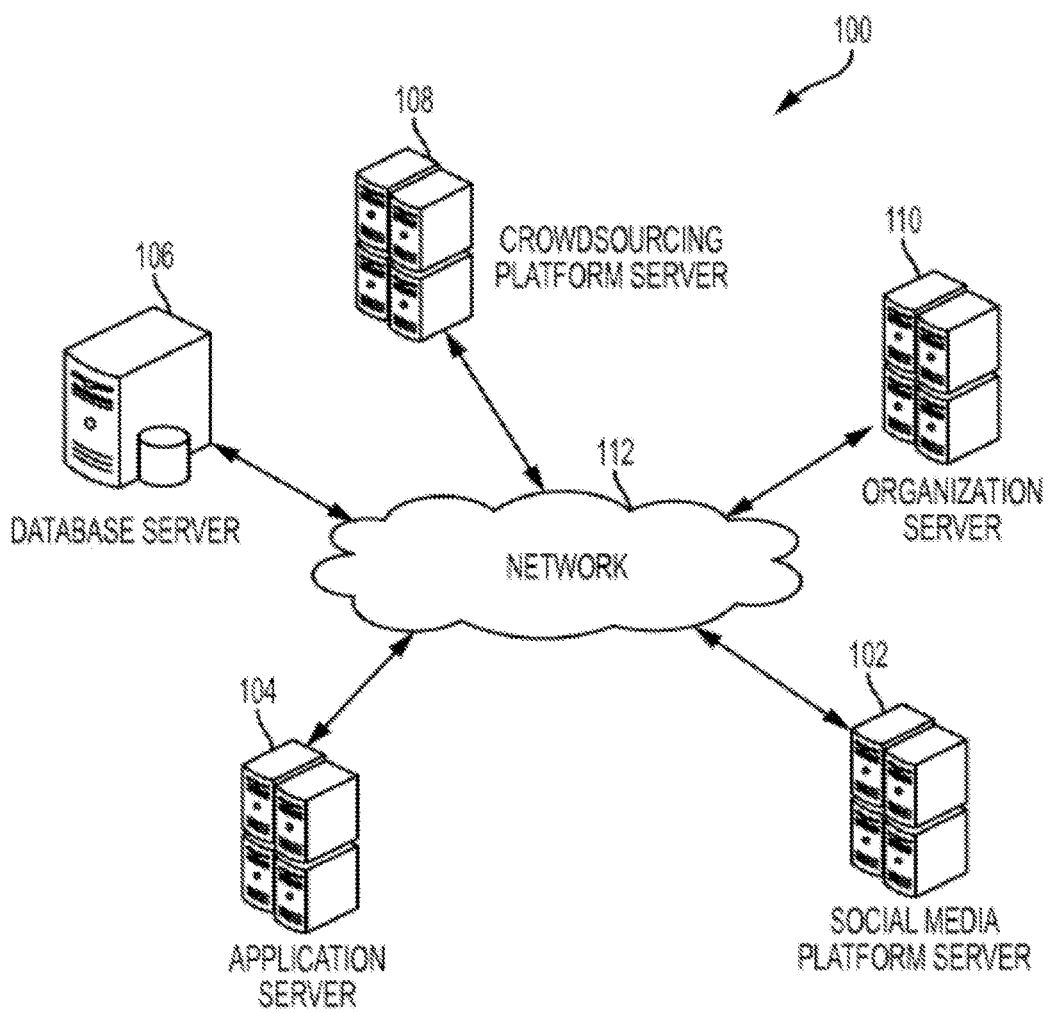
FIG. 1 is a block diagram of a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation, but that not every embodiment or example necessarily includes that particular feature, structure, characteristic, property, element, or limitation. Further, repeated use of the phrase "in an embodiment" does not necessarily refer to the same embodiment.

Definitions

The following terms shall have, for the purposes of this application, the meanings set forth below.

A "social media platform" refers to a communication medium through which a user may interact with one or more other users who are known to or otherwise acquainted with the user. Further, apart from interacting with one another, the user and the one or more other users may post one or more messages on the social media platform. Thereafter, the one or more users may interact with one another in reference to the one or more messages. Examples of social media platforms include, but are not limited to, social networking websites (e.g., Facebook™, Twitter™, LinkedIn™, Google+™ and so forth), chats/messaging applications, web-blogs, web-forums, community portals, online communities, or online interest groups.

A "user" refers to an individual, who is a member of one or more social media platforms. In an embodiment, the user may have registered on a social media platform to become a member of the social media platform. During registration, the user may have provided various information such as, but not limited to, a name, a gender, a location, an age, an education, a profession, one or more images, interests/hobbies, and so forth. Such information may be used to create a user profile, containing various attributes, which may be maintained by the social media platform. In an embodiment, the user may perform one or more activities on the social media platform such as, but not limited to, posting a message on the social media platform, sharing other user's messages, and interacting with the other users of the social media platform. In an embodiment, the user may share one or more messages on the one or more social media platforms. The one or more messages may include one or more types of messages such as, but are not limited to, an audio message, a video message, a text message, or a combination thereof.

"One or more messages" refer to information communicated between two or more individuals or groups of individuals with respect to a particular topic. In an embodiment, one or more users of a social media platform may post/share the one or more messages related to a topic of interest on the social media platform. In an embodiment, the one or more messages may include one or more types of messages such as an audio message, a video message, a text message, or a combination thereof.

A "first tag" refers to a label assigned to each of the one or more messages. In an embodiment, the first tag may correspond to a personality type of the one or more users. For example, if a message states that "I am very excited about the India Vs Pakistan match", then the tag associated with the message may be extrovert, because users having an extrovert personality type may utilize phrases such as "excited". In an embodiment, the one or more messages, tagged with the first tag may be segregated into a first data set and a second data set. In an embodiment, the first data set may correspond to a training data. On the other hand, the second data set may correspond to a testing data. In an embodiment, each of the training data and the testing data may include a set of messages from the one or messages.

A "second tag" refers to a label predicted for the set of messages in the testing data. In an embodiment, the second tag may correspond to a personality type of the one or more users. In an embodiment, the second tag for the set of messages in the testing data may be predicted using trained one or more classifiers.

A "crowdsourcing platform" refers to a business application, wherein a broad, loosely defined as an external group of people, a community, or an organization, provides solutions as an output for any specific business processes received by the application as an input. In an embodiment, the business application can be hosted online on a web portal (e.g., a crowdsourcing platform server). Various examples of the crowdsourcing platforms include, but are not limited to, Amazon Mechanical Turk or Crowd Flower. In an embodiment, a worker (e.g., a crowdsource worker etc.) may work on one or more tasks on the crowdsourcing platform. The one or more tasks may correspond to one or more messages posted by one or more users on the one or more social media platforms.

A "personality type" refers to qualities or characteristics possessed by one or more users. The personality type may depend on one or more actions performed by the one or more users in varied situations. However, the personality type of a user may change marginally over a period and are relatively stable. The personality type may differ across users and may largely influence the behavior of the users. In an embodiment, the user may possess more than one personality types. The examples of various personality types of the user may include, but are not limited to, an openness to experience, a conscientiousness, an extraversion, an agreeableness, or a neuroticism. For example, if a user speaks slowly and very quietly, then the user may have the personality type of an introvert.

"One or more parameters" refer to parameters associated with the set of messages in the training data based on one or more types of messages. In an embodiment, the training data may include the set of messages from the one or more messages. In an embodiment, the one or more messages may include one or more types of messages such as an audio message, a video message, or a text message, as discussed above. A person having ordinary skill in the art will appreciate that the one or more parameters for different types of messages may be different. For example, the one or more parameters associated with the audio message may include, but are not limited to, a duration of the audio message, a duration for which the user speaks in the audio message, a rate of speech of the user, a pitch of the user, number of pauses taken by the user, or speaking energy of the user. In another example, the one or more parameters associated with the video message may include, but are not limited to, a posing/body language of the user, or movement parameters of the user. Further, the posing/body language of the user may correspond to, but is not limited to, a duration for which the user looks at a camera, a number of instances in which the user looked away from the camera, a proximity of the user to the camera. On the other hand, the movement parameters of the user may include, but are not limited to, a degree of excitement of the user. In another example, the one or more parameters associated with the messages of the type text message may include, but are not limited to word tokens, word sentiments, or word statistical parameters.

"One or more combinations" refer to a combination of the one or more parameters associated with the various types of messages. For example, a combination may include combining parameters of text messages with parameters of audio-video messages posted by one or more users on one or more social media platforms. Similarly, other combinations of the one or more parameters may be determined.

A "classifier" refers to a mathematical model that is used to predict a personality type of one or more users. In an embodiment, each of the one or more classifiers may be trained for a combination of the one or more parameters. Therefore, for every combination, a separate classifier may be trained. In an embodiment, the one or more classifiers may be trained by using one or more regression techniques.

FIG. 1 is a block diagram of a system environment 100, in which various embodiments can be implemented. The system environment 100 includes a social media platform server 102, an application server 104, a database server 106, a crowdsourcing platform server 108, an organization server 110, and a network 112. Various devices in the system environment 100 (e.g., the social media platform server 102, the application server 104, the database server 106, the crowdsourcing platform server 108, and the organization server 110) may be interconnected over the network 112.

The social media platform server 102 may refer to a computing device that may include a processor, a memory, and other hardware devices. The social media platform server 102 is configured to host one or more social media platforms such as, but not limited to, a social networking website, a chat/messaging application, a web-blog, web-forums, a community portal, an online community, or an online interest group. In an embodiment, one or more users may register on the one or more social media platforms. In an embodiment, the one or more users may post/share one or more messages on the one or more social media platforms. The one or more messages may include one or more types of messages such as, but not limited to, an audio message, a video message, or a text message. In an embodiment, the social media platform server 102 may store the one or more messages in the database server 106. In an embodiment, the one or more users associated with the social media platform server 102 may be of interest to an organization. In an embodiment, the social media platform server 102 may be realized through various web-based technologies such as, but not limited to, a Java web-framework, a .NET framework, a PHP framework, or any other web-application framework.

The application server 104 may refer to a computing device configured to create a classifier capable of predicting a personality type of one or more users. In an embodiment, the application server 104 includes one or more processors, and one or more memories coupled to the one or more processors. The one or more memories are used to store instructions that are executable by the one or more processors to perform predetermined operations. In an embodiment, the application server 104 may extract the one or more messages from the one or more social media platforms. The one or more messages may include one or more types of messages such as, an audio message, a video message, or a text message. Further, the application server 104 may transmit the one or more messages as one or more tagging tasks to the crowdsourcing platform server 108. In an embodiment, the application server 104 may receive a first tag associated with each of the one or more messages from the crowdsourcing platform server 108. In an embodiment, the first tag may correspond to a personality type of the one or more users associated with the respective messages. In an embodiment, the personality type of the one or more users may correspond to at least one of, an openness to experience, a conscientiousness, an extraversion, an agreeableness, and a neuroticism. A person having ordinary skill in the art will understand that the scope of the disclosure is not limited to the aforementioned personality types. In an embodiment, various other personality types such as sensing, thinking, judgmental, intuition, feeling, perception may be taken into account while tagging the one or more messages.

Further, the application server 104 may segregate the one or more messages, tagged with the first tag, into a first data set and a second data set. In an embodiment, the first data set may correspond to a training data. On the other hand, the second data set may correspond to a testing data. In an embodiment, each of the training data and the testing data comprises a set of messages from the one or more messages. Further, the application server 104 may determine one or more parameters associated with the set of messages in the training data based on the one or more types of messages. In an embodiment, the one or more parameters may vary based on the one or more types of messages (i.e., an audio message, a video message, or a text message). For instance, if the message corresponds to the audio message, the one or more parameters associated with the audio message may include, but are not limited to, a duration of the audio message, a duration for which the user speaks in the audio message, a rate of speech of the user, a pitch of the user, a number of pauses taken by the user, or a speaking energy of the user. Further, if the message corresponds to the text message, the one or more parameters associated with the text message may include, but are not limited to, word tokens, word sentiments, or word statistical parameters. For instance, if the message corresponds to the video message, the one or more parameters associated with the video message may include, but are not limited to, a posing/body language of the user, or movement parameters of the user. The posing/body language of the user may include, but are not limited to, a duration for which the user looks at a camera, a number of instances in which the user looked away from the camera, a proximity of the user to the camera. On the other hand, the movement parameters of the user may include, but are not limited to, a degree of excitement of the user. Thereafter, the application server 104 may determine one or more combinations of the one or more parameters based on the one or more types of messages. In an embodiment, the one or more combinations may include, but are not limited to, audio-video parameters, a combination of the audio-video parameters and the word statistical parameters, a combination of the word statistical parameters and the word sentiments, or a combination of the word statistical parameters, the words sentiment, and a gender of the user. A person having ordinary skill in the art will understand that the scope of the disclosure is not limited to the aforementioned one or more combinations. In an embodiment, various other combinations of the one or more parameters (such as audio-video parameters and a gender of the user, etc.) may be taken into account, without departing from the scope of the disclosure.

In an embodiment, the application server 104 may train one or more classifiers for the personality type. Each of the one or more classifiers may be trained for a combination from the one or more combinations of the one or more parameters. Further, the application server 104 may predict a second tag for the set of messages in the testing data using the trained one or more classifiers. In an embodiment, the application server 104 may determine a performance of each of the one or more classifiers based on a comparison of the second tag with the first tag associated with the set of messages in the testing data. The performance of each of the one or more classifiers has been described later in conjunction with the FIG. 3. Based on the determined performance of each of the one or more classifiers, the application server 104 may rank the one or more classifiers for the personality type of the one or more users. Thereafter, the application server 104 may select a classifier from the one or more classifiers. In an embodiment, the selected classifier may indicate a best combination from the one or more combinations of the one or more parameters to predict the personality type of the one or more users.

The application server 104 may be realized through various types of application servers such as, but not limited to, Microsoft® SQL server, Java application server, .NET framework, Base4, Oracle, and My SQL. In another embodiment, the application server 104 may be realized as an application hosted/running on a computing device such as, but not limited to, a personal computer, a laptop, a personal digital assistant (PDA), a mobile device, a tablet, or any other computing device.

The database server 106 may refer to a device or a computer that is configured to store the one or more messages posted by the one or more users on the one or more social media platforms. In an embodiment, the database server 106 may be queried by at least one of the social media platform server 102, and the application server 104, to extract/store the one or more messages. In an embodiment, the database server 106 may store a first tag associated with each of the one or more messages. The first tag may correspond to a personality type of the one or more users. Further, the database server 106 may store the first data set and the second data set. In an embodiment, the first data set may correspond to a training data. On the other hand, the second data set may correspond to a testing data. In an embodiment, each of the training data and the testing data includes a set of messages from the one or more messages. In an embodiment, the database server 106 may store the one or more parameters associated with the set of messages of the training data. Further, the database server 106 may store the one or more combinations of the one or more parameters. Further, the database server 106 may store the one or more classifiers for the personality type. In an embodiment, the database server 106 may store a second tag for the set of messages of the testing data. In an embodiment, the database server 106 may store a performance of each of the one or more classifiers. Based on the performance of each of the one or more classifiers, the database server 106 may store the ranking of each of the one or more classifiers for the personality type of the one or more users. In an embodiment, the database server 106 may store the classifier selected from the one or more classifiers.

In an embodiment, the database server 106 may be configured to transmit or receive one or more instructions/ tasks/information/features to/from one or more devices, such as the social media platform server 102, and the application server 104 over the network 112. In an embodiment, the database server 106 may be realized through various technologies such as, but not limited to, Microsoft® SQL Server, Oracle™, and My SQL™. In an embodiment, the social media platform server 102, and the application server 104 may connect to the database server 106 using one or more protocols such as, but not limited to, Open Database Connectivity (ODBC) protocol and Java Database Connectivity (JDBC) protocol.

A person with ordinary skill in the art will understand that the scope of the disclosure is not limited to the database server 106 as a separate entity. In an embodiment, the functionalities of the database server 106 can be integrated into the application server 104 and/or the social media platform server 102.

The crowdsourcing platform server 108 may refer to a computing device that is configured to host one or more crowdsourcing platforms. In an embodiment, the crowdsourcing platform server 108 may receive the one or more messages as one or more tagging tasks from the social media platform server 102. In an embodiment, the crowdsourcing platform server 108 may transmit the one or more tagging tasks to one or more workers on their respective computing devices (not shown). The one or more workers may determine a personality type of the one or more users associated with each of the one or more messages. In an embodiment, the one or more workers may tag each message by providing the first tag to the message. The first tag, assigned to a message, may correspond to a personality type of the user, associated with the message. In an embodiment, the crowdsourcing platform server 108 may transmit the first tagged messages to the application server 104. In an alternate embodiment, the crowdsourcing platform server 108 may store the one or more tagged messages in the database server 106. The crowdsourcing platform server 108 may be realized through an application server such as, but not limited to, a Java application server, a .NET framework, and a Base4 application server.

The organization server 110 may refer to a computing device that may send a request to the application server 104 for creating a classifier capable of predicting a personality type of one or more users. In an embodiment, a user may be a target user for an organization. In an embodiment, the organization server 110 may be realized through various web-based technologies such as, but not limited to, a Java web-framework, a .NET framework, a PHP framework, or any other web-application framework. A person skilled in the art will appreciate that the scope of the disclosure is not limited to the organization server 110 being realized as an application server. The organization server 110 may be realized as an application hosted/running on a computing device such as, but not limited to, a personal computer, a laptop, a personal digital assistant (PDA), a mobile device, a tablet, or any other computing device.

Further, a person having ordinary skill in the art will understand that the scope of the disclosure should not be limited to the application server 104 and the organization server 110 as separate entities. In an embodiment, the functionalities of the application server 104 can be integrated into the organization server 110.

The network 112 corresponds to a medium through which content and messages flow between various devices of the system environment 100 (e.g., the social media platform server 102, the application server 104, the database server 106, the crowdsourcing platform server 108, and the organization server 110). Examples of the network 112 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 112 in accordance with various wired and wireless communication protocols such as Transmission Control Protocol and Internet Protocol (TCP/IP), User Datagram Protocol (UDP), and 2G, 3G, or 4G communication protocols.

Figure 2:
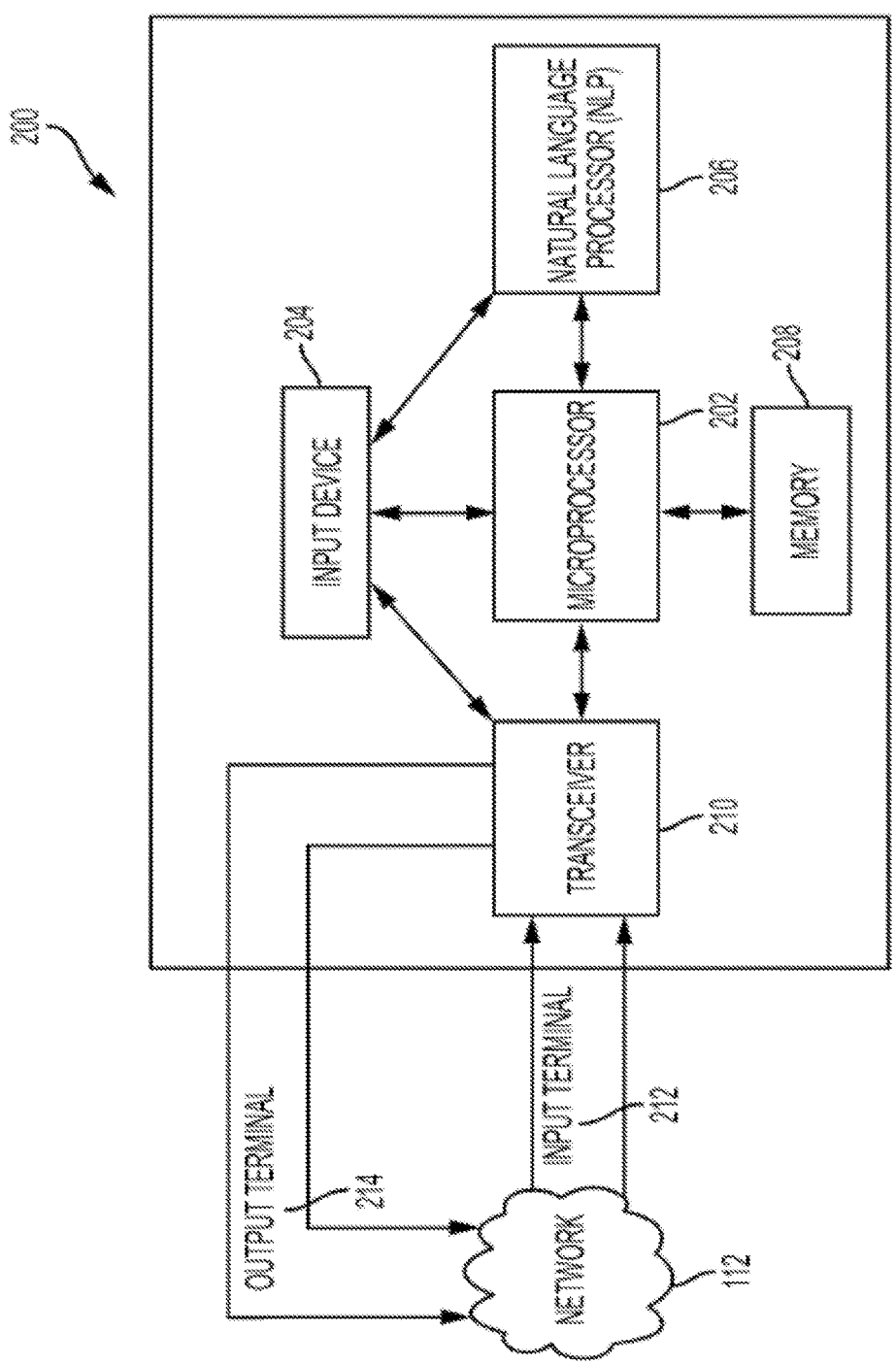
FIG. 2 is a block diagram that illustrates a system for creating a classifier capable of predicting a personality type of one or more users, in accordance with at least one embodiment.

FIG. 2 is a block diagram that illustrates a system 200 for creating a classifier capable of predicting a personality type of one or more users, in accordance with at least one embodiment. For the purpose of ongoing description, the system 200 is considered the application server 104. However, the scope of the disclosure should not be limited to the system 200 as the application server 104. The system 200 can also be realized as the social media platform server 102 or the organization server 110.

The system 200 includes a microprocessor 202, an input device 204, a natural language processor 206, a memory 208, a transceiver 210, an input terminal 212, and an output terminal 214. The microprocessor 202 is coupled to the input device 204, the natural language processor 206, the memory 208, and the transceiver 210. The transceiver 210 may connect to the network 112 through the input terminal 212 and the output terminal 214.

The microprocessor 202 includes suitable logic, circuitry, and/or interfaces that are operable to execute one or more instructions stored in the memory 208 to perform predetermined operations. The microprocessor 202 may be implemented using one or more processor technologies known in the art. Examples of the microprocessor 202 include, but are not limited to, an x86 microprocessor, an ARM microprocessor, a Reduced Instruction Set Computing (RISC) microprocessor, an Application Specific Integrated Circuit (ASIC) microprocessor, a Complex Instruction Set Computing (CISC) microprocessor, or any other microprocessor.

The input device 204 may comprise suitable logic, circuitry, interfaces, and/or code that may be operable to receive one or more messages. As discussed above, the one or more messages may include one or more types of messages such as an audio message, a video message, or a text message. The input device 204 may be operable to communicate with the microprocessor 202. Examples of the input devices may include, but are not limited to, a touch screen, a keyboard, a mouse, a joystick, a microphone, a camera, a motion sensor, a light sensor, and/or a docking station.

The natural language processor (NLP) 206 is a microprocessor configured to analyze natural language content to draw meaningful conclusions therefrom. In an embodiment, the NLP 206 may employ one or more natural language processing and one or more machine learning techniques known in the art to perform the analysis of the natural language content. In an embodiment, the NLP 206 may analyze the set of messages to determine the one or more parameters associated with the set of messages in the training data based on one or more types of messages. Examples of such techniques include, but are not limited to, Naïve Bayes classification, artificial neural networks, Support Vector Machines (SVM), multinomial logistic regression, or Gaussian Mixture Model (GMM) with Maximum Likelihood Estimation (MLE). Though the NLP 206 is depicted as separate from the microprocessor 202 in FIG. 2, a person skilled in the art will appreciate that the functionalities of the NLP 206 may be implemented within the microprocessor 202 without departing from the scope of the disclosure. In an embodiment, the NLP 206 may be implemented on an Application specific integrated circuit (ASIC), System on Chip (SoC), Field Programmable Gate Array (FPGA), etc.

The memory 208 stores a set of instructions and data. Some of the commonly known memory implementations include, but are not limited to, a random access memory (RAM), a read only memory (ROM), a hard disk drive (HDD), and a secure digital (SD) card. Further, the memory 208 includes the one or more instructions that are executable by the microprocessor 202 to perform specific operations. It is apparent to a person with ordinary skill in the art that the one or more instructions stored in the memory 208 enable the hardware of the system 200 to perform the predetermined operations.

The transceiver 210 transmits and receives messages and data to/from various components of the system environment 100 (e.g., the social media platform server 102, the database server 106, the crowdsourcing platform server 108, or the organization server 110) over the network 112. In an embodiment, the transceiver 210 may receive the one or more messages from the social media platform server 102. The transceiver 210 may further receive a first tag associated with each of the one or more messages from the crowdsourcing platform. In an embodiment, the transceiver 210 is coupled to the input terminal 212 and the output terminal 214 through which the transceiver 210 may receive and transmit data/messages respectively. Examples of the input terminal 212 and the output terminal 214 include, but are not limited to, an antenna, an Ethernet port, a USB port, or any other port that can be configured to receive and transmit data. The transceiver 210 transmits and receives data/messages in accordance with the various communication protocols such as, TCP/IP, UDP, and 2G, 3G, or 4G communication protocols through the input terminal 212 and the output terminal 214.

The operation of the system 200 for creating a classifier capable of predicting a personality type of one or more users has been described later in conjunction with FIG. 3.

Figure 3:
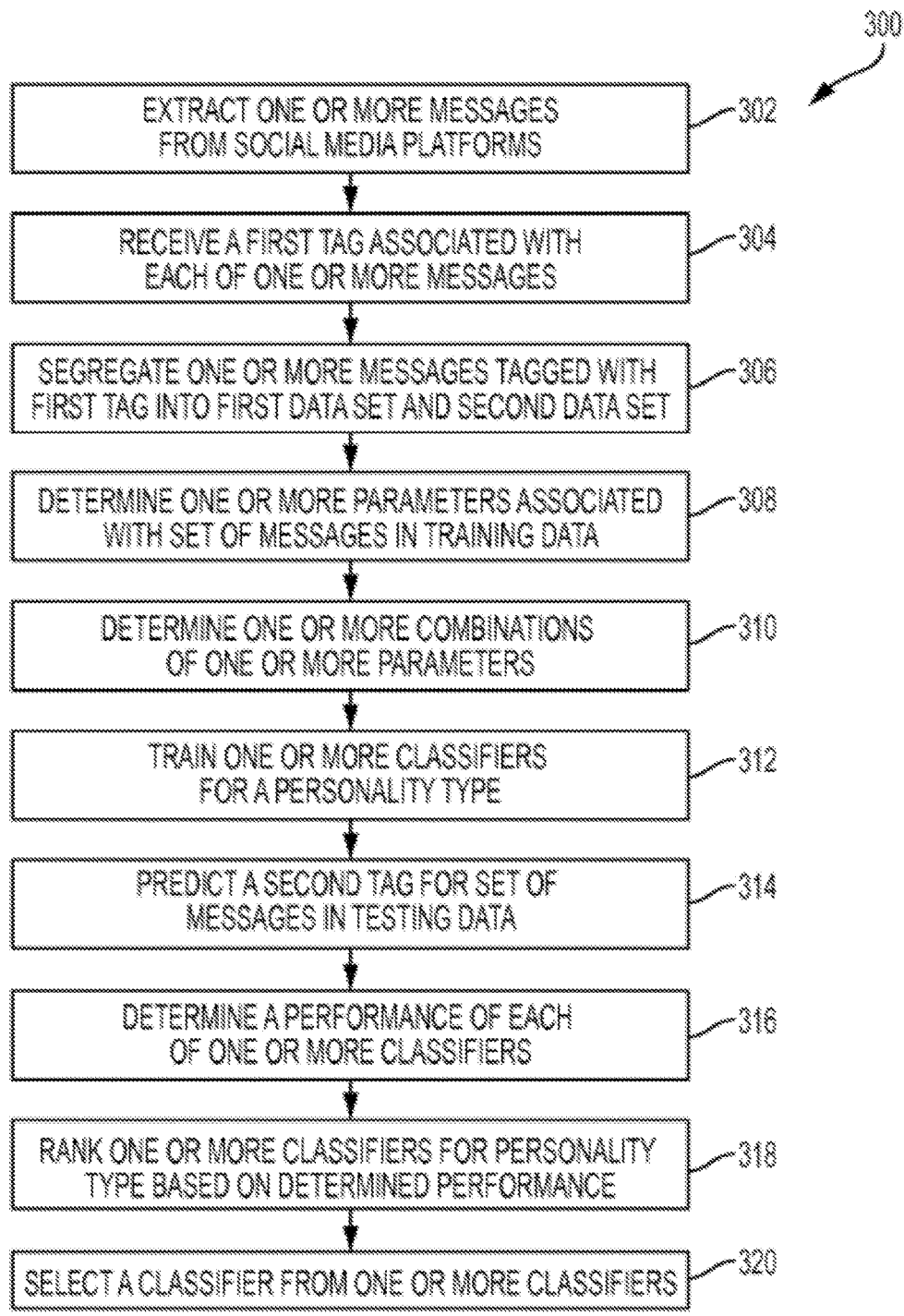
FIG. 3 is a flowchart illustrating a method for creating a classifier capable of predicting a personality type of one or more users, in accordance with at least one embodiment.

FIG. 3 is a flowchart 300 illustrating a method for creating a classifier capable of predicting a personality type of one or more users, in accordance with at least one embodiment. The flowchart 300 has been described in conjunction with FIG. 1 and FIG. 2.

At step 302, one or more messages are extracted from one or more social media platforms. In an embodiment, the microprocessor 202 may extract the one or more messages from the one or more social media platforms. In an embodiment, the one or more messages may be related/shared/generated by one or more users. The one or more users may have posted/shared the one or more messages on the one or more social media platforms. Further, the one or more users may have provided a feedback on one or more product websites. In an embodiment, the social media platforms may include, but are not limited to, social networking websites, chats/messaging applications, web-blogs, online communities, web-forums, community portals, or online interest groups. Prior to posting/sharing the one or more messages, the one or more users may register on the one or more social media platforms. Thereafter, the one or more users may post/share the one or more messages on the one or more social media platforms. Thereafter, the microprocessor 202 may extract the one or more messages from the one or more social media platforms. In an embodiment, the one or more messages may include one or more types of messages. Further, the one or more types of messages may include, but are not limited to, an audio message, a video message, a text message, or a combination thereof. For example, if a message posted by a user on Facebook that "Hurray! India won the match", then such type of message corresponds to a text message. In another scenario, if the message posted by the user is a lecture video, then such type of post may correspond to the video message.

In an embodiment, the social media platform server 102 may store the one or more messages in the database server 106. In an alternate embodiment, the microprocessor 202 may store the one or more types of messages in the database server 106.

A person having ordinary skill in the art will understand that the scope of the disclosure is not limited to analyzing the audio messages, the video messages, and the text messages separately. In an embodiment, the microprocessor 202 may perform speech to text conversion of an audio signal to generate a textual transcript.

At step 304, a first tag associated with each of one or more messages is received. In an embodiment, the microprocessor 202 may receive the first tag associated with each of the one or more messages from a crowdsourcing platform. Prior to receiving the first tag from the crowdsourcing platform, the microprocessor 202 may transmit the one or more messages (received from the social media platform) to the crowdsourcing platform server 108 as one or more tagging tasks. In an embodiment, the crowdsourcing platform server 108 may post the one or more tagging tasks to one or more workers on their respective computing devices on the crowdsourcing platform. In an embodiment, the one or more workers may determine a personality type of the one or more users, who are associated with each of the one or more messages. In an alternate embodiment, the workers may label the one or more messages. In an embodiment, the label may correspond to the first tag. Further, the first tag may correspond to the personality type of the one or more users associated with each of the one or more messages. In an embodiment, the personality type of the one or more users may correspond to at least one of, an openness to experience, a conscientiousness, an extraversion, an agreeableness, or a neuroticism.

Once the first tag has been assigned to each of the one or more messages, the microprocessor 202 may receive the first tagged messages from the crowdsourcing platform server 108. For example, if a text message corresponds to "I am excited to play a cricket match on Sunday", then the tag associated with this text message may correspond to an extraversion personality type of the user. In an embodiment, the crowdsourcing platform server 108 may store the first tagged messages in the database server 106.

A person having ordinary skill in the art will understand that the scope of the disclosure is not limited to determining the first tag through crowdsourcing only. In an embodiment, the microprocessor 202 may employ one or more known techniques to label/tag the one or more messages. For instance, if the one or more messages correspond to text messages, the microprocessor 202 may employ techniques explained in the U.S. application Ser. No. 14/624,925, filed Feb. 18, 2015, assigned to Xerox Corporation. The U.S. application has been incorporated in its entirety. Similarly, the microprocessor 202 may employ one or more known image processing techniques to determine the first tag associated with each of the one or more messages.

Further, in an embodiment, the microprocessor 202 may determine a score of each of the one or more messages against one or more personality types based on the first tag associated with each of the one or more messages. The score may be either a positive or a negative value for a particular personality type. For example, a message indicating an introvert personality type may receive a negative score in an extraversion personality type. In another scenario, a message indicating an extrovert personality type may receive a positive score in an extraversion personality type.

A person having ordinary skill in the art will understand that the scope of the disclosure is not limited to the aforementioned personality types. In an embodiment, various other personality tags such as sensing, thinking, judgmental, intuition, feeling, perception may be taken into account while tagging the one or more messages.

At step 306, one or more messages, tagged with the first tag are segregated into a first data set and a second data set. In an embodiment, the microprocessor 202 may segregate the one or more messages, tagged with the first tag into the first data set and the second data set randomly. In an embodiment, the first data set may correspond to a training data. On the other hand, the second data set may correspond to a testing data. In an embodiment, each of the training data and the testing data may include set of messages from the one or more messages. The testing data may include the set of messages for one or more personality types such as the conscientiousness, the agreeableness, or the neuroticism personalities.

At step 308, one or more parameters associated with the set of messages in the training data are determined. In an embodiment, the microprocessor 202 may determine the one or more parameters associated with the set of messages in the training data based on the one or more types of messages. As discussed above, the training data may be obtained by segregating the one or more messages, tagged with the first tag. In an embodiment, the training data may include the set of messages from the one or more messages. As discussed above, the one or more messages may include, but are not limited to, the audio message, the video message, or the text message. Therefore, the one or more parameters for the one or more types of messages may be different. In an embodiment, the microprocessor 202 may determine the one or more parameters for each of one or more types of messages.

One or More Parameters of Audio Message

In an embodiment, if a message corresponds to an audio message, the microprocessor 202 may analyze an audio signal (in the audio message) to determine the one or more parameters associated with the audio message. In an embodiment, the microprocessor 202 may employ one or more signal processing techniques to determine the one or more parameters associated with the audio message. In an embodiment, the one or more parameters associated with the audio message may include, but are not limited to, a duration of the audio message, a duration for which the user speaks in the audio message, a rate of speech of the user, a pitch of the user, a number of pauses taken by the user, or a speaking energy of the user.

In an embodiment, the microprocessor 202 may analyze the audio signal either in frequency domain or in time domain. In an embodiment, the microprocessor 202 may determine a number of peaks and a number of valleys in the audio signal to determine the number of pauses taken by the user in the audio message. Further, the microprocessor 202 may determine magnitude of the peaks in the audio signal to determine the pitch of the user. In an embodiment, the pitch of the user may be deterministic of a degree of excitement of the user. For example, if the audio message corresponds to a speech of a user, then the microprocessor 202 may determine pitch of the user in the speech, a duration of the speech, speaking energy of the user during the speech, etc.

Further, in an embodiment, the microprocessor 202 may perform speech to text conversion to convert the speech of the user to textual transcription. Thereafter, the microprocessor 202 may treat the textual transcription as a text message and accordingly determine the one or more parameters. In an embodiment, the one or more parameters associated with the text message has been described later.

One or More Parameters of Video Message

In an embodiment, if the message corresponds to a video message, the microprocessor 202 may extract the audio signal from the video message. The microprocessor 202 may determine the one or more parameters associated with the audio message of the extracted audio signal as described in supra. Further, the microprocessor 202 may employ one or more image processing techniques on the video message to determine the one or more parameters associated with the video message.

In an embodiment, the one or more video parameters may be segregated in two categories. In an embodiment, the first category may include a first set of parameters related to a posing/body language of the user in the video message. In an embodiment, the first set of parameters related to the posing/body language of the user may include, but are not limited to, a duration for which the user looks at a camera, a number of instances in which the user looked away from the camera, a proximity of the user to the camera. In an embodiment, the first set of parameters in the first category may be deterministic/reflective of whether the user will try to avoid direct eye contact in conversation as compared with some other type of users. Further, the proximity from the camera may be reflective of a personal space of the users. In an embodiment, a second category may include a second set of parameters that may correspond to movement parameters of the user. In an embodiment, the movement parameters of the user may be deterministic of a degree of excitement of the user. In an embodiment, the microprocessor 202 may utilize weighted motion energy images to determine the movement parameters of the user during the conversation.

One or More Parameters of Text Message

In an embodiment, if the microprocessor 202 receives a text message, the microprocessor 202 may analyze the text message to determine the one or more parameters associated with the text message. In an embodiment, the microprocessor 202 may utilize the NLP 206 that may employ one or more natural language processing techniques to determine the one or more parameters associated with the text message. In an embodiment, the one or more parameters associated with the text message may include, but are not limited to, word tokens, word sentiments, or word statistical parameters.

Word Tokens

The microprocessor 202 may determine a word choice of the user in the text message. In an embodiment, to determine the word choice, the microprocessor 202 may remove stop words from the text message. The stop words may consist of high-frequency functional words such as, but not limited to, "is", "an", "the", and "from". Such high-frequency functional words may be removed. For example, if the text message consists of a string such as "Receive an input from the user", the microprocessor 202 may remove stop words such as 'an' and 'the' from the string associated with the text message. Thereafter, the microprocessor 202 may utilize the NLP 206 that may employ the one or more natural language processing (NLP) techniques to determine the word choice of the user. In an embodiment, users with different personality types may use different selection of words to express their ideas. For example, extrovert users may use phrases such as "can't wait", "excited" more often than introvert users.

In an embodiment, the microprocessor 202 may utilize uni-gram words in the text message as individual features. In an embodiment, occurrences of the uni-gram words may be determined in the text message.

Words Sentiment

In an embodiment, the microprocessor 202 may determine sentiments of the words used in the text message. In an embodiment, the microprocessor 202 may utilize the NLP 206 that may use known natural language processing techniques to determine sentiments of the text message. For example, if the text message states, "Lost my Phone", the microprocessor 202 may extract the words "Lost" and "phone" from the text message. Thereafter, the microprocessor 202 may only consider the verb "Lost" for determining the sentiments. In an embodiment, the microprocessor 202 may utilize a look-up table to determine sentiments for the verb "Lost". In an embodiment, the look-up table may include a list of words and corresponding sentiments associated with each of the one or more words. For example, the words such as sadness, danger, hazard etc. are generally associated with negative sentiments.

In an embodiment, the microprocessor 202 may determine a positive sentiment score, a negative sentiment score, and a number of positive, negative, and neutral words in the text message. Based on the determined score, the microprocessor 202 may determine sentiments of the words used in the text message. The microprocessor 202 may employ techniques explained in the U.S. application Ser. No. 14/624,925, filed Feb. 18, 2015, assigned to Xerox Corporation, to determine the score.

Word Statistical Parameters

In an embodiment, the microprocessor 202 may determine an average length of a sentence, a number of sentences and a number of total words in each text message. In an embodiment, the word statistical parameters may be directly related to a fluency in speech. In an embodiment, the microprocessor 202 may further consider that the user with different personality types may speak at different rates or may have different complexities of speech.

In an embodiment, the microprocessor 202 may further determine a gender of the user as another parameter associated with each of the one or more messages.

A person having ordinary skill in the art will understand that the scope of the disclosure is not limited to analyzing the audio message, the video message, and the text message separately. In an embodiment, the microprocessor 202 may perform speech to text conversion of the audio signal to generate a transcript. Thereafter, the microprocessor 202 may determine the one or more parameters for transcript by considering the transcript as the text message.

It will be apparent to a person with ordinary skill in the art that the above-mentioned techniques to determine the one or more parameters associated with the set of messages in the training data have been provided only for illustration purposes and should not limit the scope of the disclosure to these techniques only.

At step 310, one or more combinations of the one or more parameters are determined. In an embodiment, the microprocessor 202 may determine the one or more combinations of the one or more parameters associated with the set of messages in the training data. For instance, the following table illustrates the one or more combinations of the one or more parameters:

TABLE 1

Combinations of the one or more parameters.

| Serial Number | Combinations of the one or more parameters |
|---|---|
| 1 | Audio - Video (AV) parameters |
| 2 | AV parameters, Word statistics (W) |
| 3 | W, sentiments (S) |
| 4 | Gender, W, S |

A person having ordinary skill in the art will understand that the scope of the disclosure is not limited to the aforementioned combinations of the one or more parameters. In an embodiment, various other types and number of combinations of the one or more parameters may be possible. For example, the microprocessor 202 may create a combination such as a combination of the AV parameters and the gender of the user, a combination of the AV parameters and the word token, and so on. In an embodiment, the one or more combinations may include, but are not limited to, the audio-video parameters, a combination of the audio-video parameters and the word statistical parameters, a combination of the word statistical parameters and the word sentiments, or a combination of the word statistical parameters, the word sentiments, and the gender of the user.

At step 312, one or more classifiers for a personality type are trained. In an embodiment, the microprocessor 202 may train the one or more classifiers for the personality type from one or more personality types. In an embodiment, the microprocessor 202 may extract the training data for a personality type from the database server 106. In an embodiment, the training data may include the set of messages from the one or more messages. The set of messages may correspond to a random set of messages, tagged with the first tag. For example, for personality type "extraversion", a positive label means that the user is an extrovert, and a negative label means that the user is an introvert. In an embodiment, if the personality type corresponds to an "extraversion" personality type, then the microprocessor 202 may extract the tagged messages corresponding to the extraversion personality type from the database server 106. Thereafter, for a combination of the one or more parameters, the microprocessor 202 may train the classifier for the personality type. Therefore, for a personality type, multiple classifiers may be trained. For example, referring to Table 1, four classifiers may be trained for each personality type. Thus, each of the one or more classifiers may be trained for a combination from the one or more combinations of the one or more parameters. Similarly, in an embodiment, the one or more classifiers may be trained for each of the one or more personality types. In an embodiment, the microprocessor 202 may train the classifier by using one or more regression techniques. The one or more regression techniques may include, but are not limited to, a ridge regression technique, or a logistic regression technique. In an alternate embodiment, the microprocessor 202 may employ a binary classification technique to train the one or more classifiers for the personality type.

At step 314, a second tag for the set of messages in the testing data is predicted. In an embodiment, the microprocessor 202 may predict the second tag for the set of messages in the training data using the trained one or more classifiers for the personality type. The training of the one or more classifiers has already been discussed in the step 312. In an embodiment, the microprocessor 202 may extract the testing data from the database server 106. In an embodiment, the testing data may include the set of messages from the one or more messages. Further, the microprocessor 202 may run each of the trained one or more classifiers on the first tagged messages in the testing data to predict the second tag. For example, as discussed above, if the personality type corresponds to an extraversion personality type, then the microprocessor 202 may run each of the one or more classifiers (i.e., four classifiers) on the first tagged messages in the testing data for the extraversion personality type to determine the second tag. In an embodiment, the second tag may correspond to the personality type of the one or more users. Further, in an embodiment, the second tags may be similar to the first tag or may be different.

At step 316, a performance of each of the one or more classifiers is determined. In an embodiment, the microprocessor 202 may determine the performance of each of the one or more classifiers based on a comparison of the second tag with the first tag associated with the set of messages in the testing data. The second tag for the set of messages in the testing data has already been discussed above. In an embodiment, the microprocessor 202 may determine the performance of each of the one or more classifiers based on one or more performance parameters associated with each of the one or more messages. The one or more performance parameters may include, but are not limited to, a precision, a Recall, and an f-measure. In an embodiment, the microprocessor 202 may utilize one or more regression techniques such as a logistic regression technique, or a ridge regression technique etc., to determine the one or more performance parameters for each of the one or more classifiers for the personality type. For instance, the following table illustrates the one or more performance parameters for each of the one or more classifiers for the extraversion personality type:

TABLE 2

One or more performance parameters of each of one or more classifiers for extraversion personality type.
Personality: Extraversion

| One or more Combinations | Class = Y | | | Weighted | | |
| --- | --- | --- | --- | --- | --- | --- |
| | Precision | Recall | f-measure | Precision | Recall | f-measure |
| AV, Gender, W | 0.526 | 0.588 | 0.556 | 0.724 | 0.714 | 0.718 |
| AV, Gender, S | 0.474 | 0.529 | 0.500 | 0.690 | 0.679 | 0.683 |
| AV | 0.474 | 0.529 | 0.500 | 0.690 | 0.679 | 0.683 |
| AV, Text | 0.393 | 0.647 | 0.489 | 0.666 | 0.589 | 0.606 |
| Text | 0.393 | 0.647 | 0.489 | 0.66 | 0.589 | 0.606 |

As shown in Table 2, if the personality type corresponds to an extraversion personality type, then the microprocessor 202 determines the one or more performance parameters for each of the one or more classifiers (i.e., five classifiers). It can be observed from Table 2 that the weighted f-measure is in between 60% and 70% depending on the one or more combinations of the one or more parameters. Based on the weighted f-measure, it can also be observed that the audio-video (AV) parameter may be a common parameter among one or more combinations of the one or more parameters to distinguish extroverts from introverts.

A person having ordinary skill in the art will understand that the above-mentioned Table 2 has been provided only for illustration purposes and should not limit the scope of the disclosure to these one or more performance parameters for the extraversion personality type only. In an embodiment, the microprocessor 202 may determine the one or more performance parameters for other personality type as well.

At step 318, one or more classifiers for a personality type are ranked. In an embodiment, the microprocessor 202 may rank the one or more classifiers for the personality type of the one or more users based on the performance of each of the one or more classifiers. The performance of each of the one or more classifiers may be determined based on the one or more performance parameters, as discussed above. For example, from the Table 2, it can be observed that a combination (AV, Gender, W) has better weighted f-measure as compared to other combinations. Therefore, the ranking of the one or more classifiers for the extraversion personality type is (AV, Gender, W), (AV, Gender, S), (AV), (AV, Text), and (Text).

At step 320, a classifier from the one or more classifiers is selected. In an embodiment, the microprocessor 202 may select the classifier from the one or more classifiers based on the ranking. The ranking of each of the one or more classifiers for the personality type may be determined based on the performance of each of the one or more classifiers, as discussed above. In an embodiment, the selected classifier may be indicative of a best combination from the one or more combinations of the one or more parameters to predict the personality type of the user. For example, from the Table 2, it can be observed that the audio-video parameters may be a strong parameter in the extraversion personality type. Therefore, the classifier (AV, Gender, W) is a best combination from the one or more combinations to predict the personality type (i.e., extraversion) of the user. Similarly, a selected classifier may be different for different personality type. For example, if a personality type corresponds to an agreeableness personality type, then a sentiment parameter may be a strong parameter among all other combinations of the one or more parameters.

In an alternate embodiment, the selected classifier may be further utilizable to categorize one or more second messages. The one or more second messages may be posted by the one or more users on the one or more social media platforms.

The disclosed embodiments encompass numerous advantages. Through various embodiments of the disclosure, a classifier is created for a prediction of a personality type of one or more users. It is disclosed that a first tag associated with each of the one or more messages may be received from a crowdsourcing platform. Further, it is disclosed that the one or more messages, tagged with the first tag may be segregated into a first data set (i.e., a training data) and a second data set (i.e., a testing data). Each of the training data and the testing data may include set of messages from the one or more messages. Further, it is disclosed that one or more parameters associated with the set of messages in the training data may be determined based on one or more types of messages. The one or more types of messages may correspond to a text message, an audio message, or a video message. Further, it is disclosed that one or more classifiers may be trained for the personality type. Each of the one or more classifiers may be trained for a combination from one or more combinations of the one or more parameters. Based on the trained one or more classifiers, a second tag for the set of messages in the testing data is determined. Further, it is disclosed that a performance of each of the one or more classifiers is determined based on a comparison of the second tag with the first tag associated with the set of messages in the testing data. Thereafter, a classifier is selected from one or more classifiers based on the performance of each of the one or more classifiers. The selected classifier may indicate a best combination from the one or more combinations to predict the personality type of the one or more users. Such a personality type prediction may be more accurate as it is determined based on classifiers trained on manually tagged data. Organizations may benefit from such personality type prediction as this may help them to identify their target users effectively.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic." Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for creating a classifier capable of predicting a personality type of the one or more users have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method for predicting a personality type of one or more users, the method comprising:
    retrieving, by one or more microprocessors, one or more messages from a social media platform, wherein the one or more messages include at least one of an audio message, a video message, or a text message;
    receiving, by a transceiver, a first tag associated with each of the one or more messages, from a crowdsourcing platform, wherein the first tag relates to the personality type of the one or more users;
    segregating, by the one or more microprocessors, the one or more messages, tagged with the first tag, into a first data set and a second data set, wherein the first data set corresponds to a training data, wherein the second data set corresponds to a testing data, and wherein each of the training data and the testing data comprises a set of messages from the one or more messages;
    determining, by the one or more microprocessors, one or more parameters associated with the set of messages in the training data based on the one or more messages;

determining, by the one or more microprocessors, one or more combinations of the one or more parameters;

training, by the one or more microprocessors, one or more classifiers for the personality type, wherein each of the one or more classifiers is trained for a combination from the one or more combinations of the one or more parameters;

predicting, by the one or more microprocessors, a second tag for the set of messages in the testing data using the trained one or more classifiers;

determining, by the one or more microprocessors, a performance of each of the one or more classifiers, based on a comparison of the second tag with the first tag associated with the set of messages in the testing data;

ranking, by the one or more microprocessors, the one or more classifiers based on the performance of each of the one or more classifiers;

selecting, by the one or more microprocessors, a classifier from the one or more classifiers based on a result of the ranking, wherein the selected classifier is indicative of a best combination from the one or more combinations of the one or more parameters to predict the personality type of the one or more users;

using, by the one or more microprocessors, the selected classifier to categorize at least one of another audio, video, and text messages to identify target users of a product or service; and transmitting, by the transceiver, the identified target users to one or more organizations for the one or more organizations to place advertisement of the product or service on the social media platform targeting the identified target users.

2. The method of claim 1, wherein the one or more parameters associated with the set of messages are determined by using at least one of signal processing techniques, image processing techniques, or natural language processing techniques.

3. The method of claim 1, wherein the one or more parameters associated with the audio message comprise at least one of a duration of the audio message, a duration for which a user speaks in the audio message, a rate of speech of the user, a pitch of the user, or a number of pauses taken by the user.

4. The method of claim 1, wherein the one or more parameters associated with the video message comprise at least one of a posing/body language of a user, or movement parameters of the user, wherein the posing/body language of the user comprises at least one of a duration for which the user looks at a camera, a number of instances in which the user looked away from the camera, a proximity of the user to the camera, wherein the movement parameters of the user comprise at least a degree of excitement of the user.

5. The method of claim 1, wherein the one or more parameters associated with the text message comprise at least one of word tokens, word sentiments, or word statistical parameters.

6. The method of claim 1, wherein the personality type comprises at least one of an openness to experience, a conscientiousness, an extraversion, an agreeableness, or a neuroticism.

7. The method of claim 1, wherein the social media platform comprises at least one of social networking websites, chat/messaging applications, web-blogs, online communities, web-forums, community portals, or online interest groups.

8. The method of claim 1, wherein the one or more classifiers are trained using one or more regression techniques comprising at least one of a ridge regression technique, a logistic regression technique, or a binary classification technique.

9. The method of claim 1, wherein the one or more combinations of the one or more parameters comprise at least one of audio-video parameters, a combination of the audio-video parameters and word statistical parameters, a combination of the word statistical parameters and word sentiments, or a combination of the word statistical parameters, the word sentiments, and a gender of a user.

10. The method of claim 1, wherein the performance of each of the one or more classifiers is determined based on one or more performance parameters comprising at least one of a precision, a recall, and an f-measure.

11. The method of claim 1 further comprising ranking, by the one or more microprocessors, the one or more classifiers for the personality type based on the performance.

12. The method of claim 1 further comprising determining, by the one or more microprocessors, a score of each of the one or more messages against the personality type based on the first tag associated with each of the one or more messages, wherein the score is indicative of a positive score, or a negative score.

13. A system predicting a personality type of one or more users, the system comprising:
   a transceiver is configured to receive a first tag associated with each of one or more messages, from a crowd-sourcing platform, wherein the first tag relates to the personality type of the one or more users, wherein the one or more messages are shared by the one or more users on one or more social media platforms, wherein the one or more messages include at least one of an audio message, a video message, or a text message;
   one or more microprocessors configured to:
   segregate the one or more messages, tagged with the first tag, into a first data set and a second data set, wherein the first data set corresponds to a training data, wherein the second data set corresponds to a testing data, and wherein each of the training data and the testing data comprises a set of messages from the one or more messages;
   determine one or more parameters associated with the set of messages in the training data based on the one or more types of messages;
   determine one or more combinations of the one or more parameters;
   train one or more classifiers for the personality type, wherein each of the one or more classifiers is trained for a combination from the one or more combinations of the one or more parameters;
   predict a second tag for the set of messages in the testing data using the trained one or more classifiers;
   determine a performance of each of the one or more classifiers, based on a comparison of the second tag with the first tag associated with the set of messages in the testing data;
   rank the one or more classifiers based on the performance of each of the one or more classifiers;
   select a classifier from the one or more classifiers based on a result of the ranking, wherein the selected classifier is indicative of a best combination from the one or more combinations of the one or more parameters to predict the personality type of the one or more users; and use the selected classifier to categorize at least one of another audio, video, and text messages to identify target users of a product or service;

wherein the transceiver is further configured to transmit the identified target users to one or more organizations for the one or more organizations to place advertisement of the product or service on the one or more social media platforms targeting the identified target users.

14. The system of claim 13, wherein the one or more parameters associated with the set of messages are determined by using at least one of signal processing techniques, image processing techniques, or natural language processing techniques.

15. The system of claim 13, wherein the one or more parameters associated with the audio message comprise at least one of a duration of the audio message, a duration for which a user speaks in the audio message, a rate of speech of the user, a pitch of the user, or a number of pauses taken by the user.

16. The system of claim 13, wherein the one or more parameters associated with the video message comprise at least one of a posing/body language of a user, or movement parameters of the user, wherein the posing/body language of the user comprises at least one of a duration for which the user looks at a camera, a number of instances in which the user looked away from the camera, a proximity of the user to the camera, wherein the movement parameters of the user comprise at least a degree of excitement of the user.

17. The system of claim 13, wherein the one or more parameters associated with the text message comprise at least one of word tokens, words sentiment, or word statistical parameters.

18. The system of claim 13, wherein the personality type comprises at least one of an openness to experience, a conscientiousness, an extraversion, an agreeableness, or a neuroticism.

19. The system of claim 13, wherein the one or more social media platforms comprise at least one of social networking websites, chat/messaging applications, web-blogs, online communities, web-forums, community portals, or online interest groups.

20. The system of claim 13, wherein the one or more combinations of the one or more parameters comprise at least one of audio-video parameters, a combination of the audio-video parameters and word statistical parameters, a combination of the word statistical parameters and word sentiments, or a combination of the word statistical parameters, the word sentiments, and a gender of a user.

21. A computer program product for use with a computer, the computer program product comprising a non-transitory computer readable medium, wherein the non-transitory computer readable medium stores a computer program code for predicting a personality type of one or more users, wherein the computer program code is executable by one or more microprocessors to:

retrieve, by the one or more microprocessors, one or more messages from a social media platform, wherein the one or more messages include at least one of an audio message, a video message, or a text message;

receive, by a transceiver, a first tag associated with each of the one or more messages, from a crowdsourcing platform, wherein the first tag relates to the personality type of the one or more users;

segregate, by the one or more microprocessors, the one or more messages, tagged with the first tag, into a first data set and a second data set, wherein the first data set corresponds to a training data, wherein the second data set corresponds to a testing data, and wherein each of the training data and the testing data comprises a set of messages from the one or more messages;

determine, by the one or more microprocessors, one or more parameters associated with the set of messages in the training data based on the one or more messages;

determine, by the one or more microprocessors, one or more combinations of the one or more parameters;

train, by the one or more microprocessors, one or more classifiers for the personality type, wherein each of the one or more classifiers is trained for a combination from the one or more combinations of the one or more parameters;

predict, by the one or more microprocessors, a second tag for the set of messages in the testing data using the trained one or more classifiers;

determine, by the one or more microprocessors, a performance of each of the one or more classifiers, based on a comparison of the second tag with the first tag associated with the set of messages in the testing data;

rank, by the one or more microprocessors, the one or more classifiers based on the performance of each of the one or more classifiers;

select, by the one or more microprocessors, a classifier from the one or more classifiers based on a result of the ranking, wherein the selected classifier is indicative of a best combination from the one or more combinations of the one or more parameters to predict the personality type of the one or more users;

use, by the one or more microprocessors, the selected classifier to categorize at least one of another audio, video, and text messages to identify target users of a product or service; and transmit, by the transceiver, the identified target users to one or more organizations for the one or more organizations to place advertisement of the product or service on the social media platform targeting the identified target users.

* * * * *